US 6,672,502 B1

United States Patent
Paul et al.

(10) Patent No.: US 6,672,502 B1
(45) Date of Patent: Jan. 6, 2004

(54) METHOD FOR MAKING DEVICES HAVING INTERMETALLIC STRUCTURES AND INTERMETALLIC DEVICES MADE THEREBY

(75) Inventors: Brian Kevin Paul, Corvallis, OR (US); Richard Dean Wilson, Corvallis, OR (US); David Eli Alman, Salem, OR (US)

(73) Assignee: The State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 91 days.

(21) Appl. No.: 09/996,621

(22) Filed: Nov. 28, 2001

Related U.S. Application Data

(60) Provisional application No. 60/253,683, filed on Nov. 28, 2000, and provisional application No. 60/253,609, filed on Nov. 28, 2000.

(51) Int. Cl.[7] .................. B21D 39/00; B23K 31/02; B23K 35/12; B32B 31/00
(52) U.S. Cl. .................. 228/164; 228/173.2; 228/252; 228/173; 29/17.4; 29/904
(58) Field of Search .................. 228/135, 141.1, 228/164, 170, 173.2, 182, 193, 203, 252; 29/17.1, 17.3, 17.4, 904

(56) References Cited

U.S. PATENT DOCUMENTS

| | | | | |
|---|---|---|---|---|
| 5,571,754 A | * | 11/1996 | Bertin et al. | 438/109 |
| 5,648,684 A | * | 7/1997 | Bertin et al. | 257/685 |
| 5,769,985 A | * | 6/1998 | Kawakami et al. | 156/89.28 |
| 5,779,833 A | * | 7/1998 | Cawley et al. | 156/89.11 |
| 5,985,068 A | * | 11/1999 | Kawakami et al. | 156/89.18 |
| 6,048,432 A | * | 4/2000 | Ecer | 156/263 |
| 6,357,332 B1 | * | 3/2002 | Vecchio | 89/36.02 |

* cited by examiner

Primary Examiner—Tom Dunn
Assistant Examiner—Colleen P. Cooke
(74) Attorney, Agent, or Firm—Klarquist Sparkman, LLP

(57) ABSTRACT

A method and system for making a monolithic intermetallic structure are presented. The structure is made from lamina blanks which comprise multiple layers of metals which are patternable, or intermetallic lamina blanks that are patternable. Lamina blanks are patterned, stacked and registered, and processed to form a monolithic intermetallic structure. The advantages of a patterned monolithic intermetallic structure include physical characteristics such as melting temperature, thermal conductivity, and corrosion resistance. Applications are broad, and include among others, use as a microreactor, heat recycling device, and apparatus for producing superheated steam. Monolithic intermetallic structures may contain one or more catalysts within the internal features.

44 Claims, 11 Drawing Sheets

1302

1402

METHOD FOR MAKING DEVICES HAVING INTERMETALLIC STRUCTURES AND INTERMETALLIC DEVICES MADE THEREBY

CROSS REFERENCE TO RELATED APPLICATION

The present application claims priority from pending U.S. provisional application No. 60/253,683, filed on Nov. 28, 2000, and U.S. provisional application No. 60/253,609, filed on Nov. 28, 2000, which are incorporated herein by reference.

GOVERNMENT RIGHTS STATEMENT

This invention was developed at least in part using funds and/or facilities of the U.S. Department of Energy. The United States Government may have rights in the disclosed invention.

FIELD

The present invention concerns a method for making devices, particularly devices having an intermetallic structure that are useful for small energy and chemical systems, and devices made by the method.

BACKGROUND

Microtechnology-based Energy and Chemical Systems (MECS) are devices that rely on embedded microstructures for their function. MECS devices are mesoscopic, i.e. in a size range between macro objects, such as automobile engines and laboratory vacuum pumps, and the intricate Microtechnology-based ElectroMechanical Systems (MEMS) sensors that reside on a chip. Mesoscopic systems are expected to perform a number of important functions where a premium is placed on mobility, compactness, and/or point application. Internal processes of MECS devices operate on dimensional scales that are much smaller than traditional systems. For thermal and chemical applications, a small characteristic size provides the benefits of high rates of heat and mass transfer, large surface-to-volume ratios, and the opportunity for operating at elevated pressures.

One subclass of MECS devices that is of great interest, both for research and industrial applications, comprises high-temperature microreactors and micro-scale heat exchangers. Potential applications for microreactors include: portable power packs that may extend the operating times of devices by a factor of ten or more; on-site neutralization of toxic chemicals, eliminating the need for transport and burial; miniaturized bioreactors that can enhance production of therapeutic drugs, or others that can detect toxic compounds; gasification of coals and heavy oils; flue gas desulphurisation, and incineration of hazardous materials. Potential applications for micro-scale heat exchangers include: heat recovery for recycling waste heat; steam superheating for driving turbines; and recuperators for jet engines and diesel engines. These and other potential applications are discussed in U.S. patent application Ser. No. 09/369,679, "Microlamination Method for Making Devices," and U.S. patent application Ser. No. 60/095,605, "Methods for Making Devices by Component Dissociation and Microprojection Welding," which applications are incorporated herein by reference. Other features and applications pertinent to the present invention also are described in Paul, B. K., T. Dewey, D. Alman and R. D. Wilson, "Intermetallic Microlamination for High-Temperature Reactors," 4th Int. Conf. Microreaction Tech., Atlanta, Ga., Mar. 5–9, 2000, pp. 236–243 (American Institute of Chemical Engineers [AIChE]) incorporated herein by reference.

Because of the stringent operating requirements for microreactors, previous microreactors have been constructed using materials such as stainless steel. The work of D. W. Matson et al., "Fabrication of Microchannel Chemical Reactors Using a Metal Lamination Process," Proc. IMRET3 (April, 1999, Frankfurt Germany), represents one such microreactor constructed of 316 stainless steel; another is the work of V. Hessel et al., "High Temperature HCN Generation in a Complex Integrated Micro-reaction System," Proc. IMRET3 (April, 1999, Frankfurt Germany). At elevated temperatures of about 550° C. and above, stainless steel has low creep resistance, i.e., a high tendency to deform. The creep resistance of stainless steel is too low to be generally suitable for many high-temperature microreactor applications, such as steam superheating for driving turbines, gasification of coals and heavy oils, flue gas desulphurisation, waste heat recovery, incineration of hazardous materials, mobile engine heat recovery, and hydrogen steam reforming.

Ceramics have been identified as a possible structural material for making microreactors suited to high temperature applications. See, M. Kim et al., "The Fabrication of Flow Conduits in Ceramic Tapes and the Measurement of Fluid Flow through These Conduits," Proceedings of the ASME Dynamic Systems and Controls Division, DSC V. 66, 1998. Ceramics have a very high melting point, low thermal conductivity and high corrosion resistance. Certain ceramic properties make them unsuitable for such applications. For example, sintered ceramics can sag, then shrink and/or warp during binder removal after the sintering process is complete. Furthermore, sintered ceramics have low fractional densities, which indicates high porosity.

For the applications mentioned above, intermetallics as a class of materials have material properties more desirable than those of the previously discussed materials, such as high melting point, low thermal conductivity, and good corrosion resistance. It would be advantageous to be able to form MECS devices from intermetallics, and thus make use of high-temperature properties of intermetallics. However, to date this has proved virtually impossible because intermetallics are too brittle and therefore are poor substrates for facile machining and forming at room temperature.

SUMMARY

Embodiments of a method and apparatus for making an intermetallic device, or a device having at least an intermetallic component, are described. One embodiment of the method comprises making an intermetallic structure from laminae having one or more layers comprising substantially pure metals. Laminae are patterned to provide features, shapes, etc., which collectively define a desired structure, by machining, lithography and etching, or other patterning technology. A lamina can be patterned because at least that portion of the lamina that must be patterned comprises a patternable metal or alloy. In some embodiments, each of the layers of the lamina comprised substantially pure, patternable metal or metal alloys, which are patternable. Patterned, and possibly non-patterned laminae, are then stacked and registered in the order needed to create the final monolithic intermetallic structure. The stack of registered, patterned laminae is then processed to form a monolithic, intermetallic structure.

Patterning lamina or laminae prior to making the intermetallic eliminates the need to pattern intermetallic compounds, which typically are (1) difficult to roll into sheets of the preferred thickness range for micro-reactor applications, and (2) difficult to pattern, as intermetallics tend to be brittle at room temperature.

For those intermetallics capable of being rolled into sheets from, for instance, from directionally solidified intermetallic ingots, and then patterned through means such as lithography and chemical etch, monolithic intermetallic structures can be formed from intermetallic blank layers, particularly homogeneous (single phase composition materials) layers, that have been machined and/or otherwise patterned. The layers are then stacked and registered. The stack is subsequently bonded by a process, such as diffusion bonding, to form a monolithic intermetallic structure. This process may not be feasible for all intermetallics, such as NiAl, because there currently is no method known for rolling such materials to form foils.

Monolithic intermetallic structures may be formed with different internal geometries, topologies and/or topographies, thereby allowing for different applications. Because of their properties, including high melting temperature, high (or low) thermal conductivity (depending on the intermetallic), and high corrosion resistance, intermetallics are excellent candidates for microreactors. Applications include portable fuel cells; chemical detoxification apparatuses for environmental purposes; on-site neutralization of toxic chemicals; miniaturized bioreactors for production of pharmaceuticals; and toxic substance detection apparatuses. In addition, intermetallics are excellent materials for making high-temperature micro-scale heat exchangers.

Monolithic intermetallic structures can contain catalysts that promote specific chemical reactions, such as that needed to produce hydrogen in a fuel cell. Monolithic intermetallic structures may be fabricated so as to contain microscopic internal features, or macroscopic internal features, depending on the application, according to embodiments of the present invention.

DETAILED DESCRIPTION

I. Methods for Making Structures that Include an Intermetallic

Figure 1:
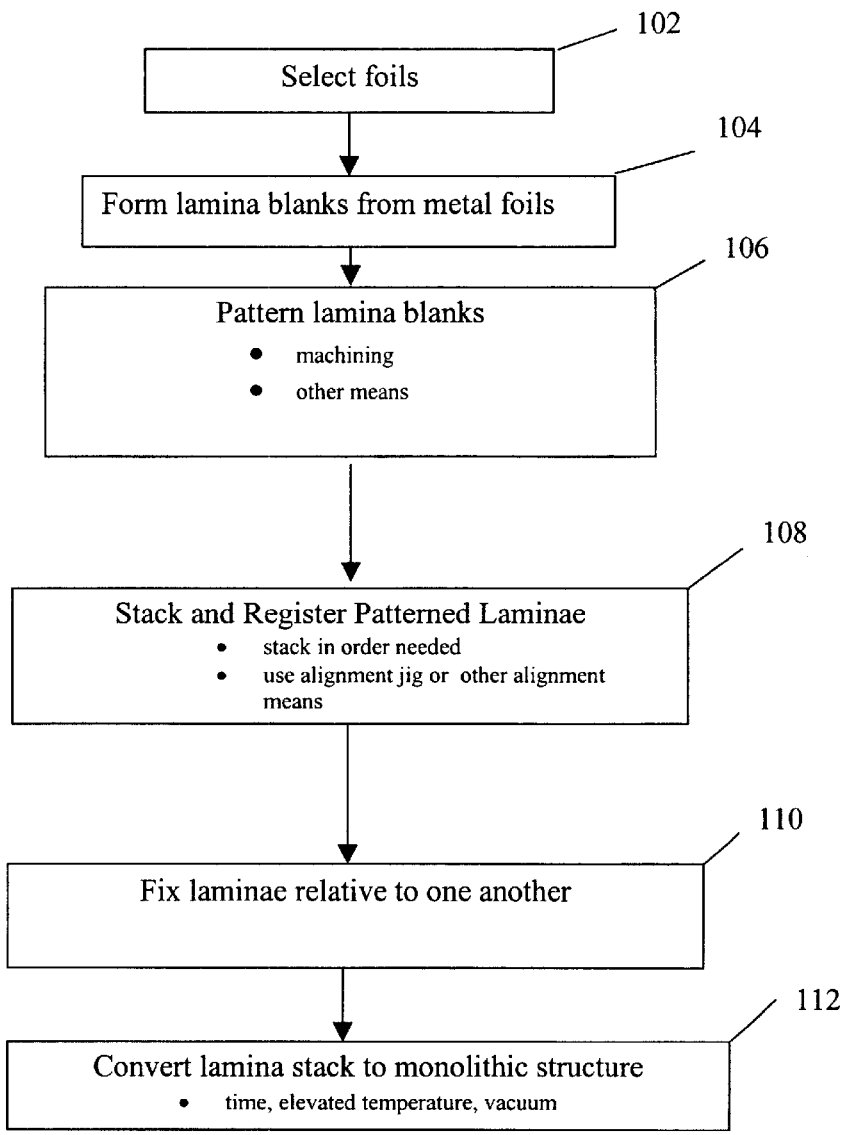
FIG. 1 is a block diagram illustrating one embodiment of a disclosed method for making a monolithic intermetallic structure.

FIG. 1 is a block diagram illustrating certain procedures of one embodiment of a disclosed method used to make a monolithic intermetallic structure. Block 102 concerns selecting materials useful for making a desired structure. Starting materials may comprise any metals, preferably metals selected from the group including, but not limited to, aluminum, nickel, titanium, molybdenum, tantalum, copper, gold, silver, lead, tin, iron, antimony, magnesium, manganese, bismuth, germanium, and tungsten. Alloys and intermetallics comprising these metals can be used as well.

In block 104, a typical lamina blank is formed from one or more metal, alloy or intermetallic layers. A "layer" comprises a sheet of material that may be of any thickness, but generally has a thickness of 32 mm or less, and more typically from about 0.025 to about 0.100 mm. Sheets of non-uniform thickness also can be used.

Structures are referred to as lamina blanks if they have not yet been "patterned," i.e., they have not been changed geometrically, topographically or topologically. The layers may be used as formed or purchased, but typically are initially surface-prepared. "Surface-prepared" generally refers to removal of foreign substances, such as grease and dirt, from a surface, and removing surface metallic compounds, such as metal oxides, that can potentially interfere with bonding and intermetallic reactions. Surface-prepared layers are stacked in a pre-selected order, and bonded, typically through application of pressure and heat, in a manner effective to form a single lamina blank having distinguishable layers.

One aspect of the disclosed embodiments comprises forming an intermetallic while practicing the method, such as during a heated bonding step. To make a uniform intermetallic structure from multiple laminae, each lamina blank typically comprises the same starting metals. To make a non-uniform intermetallic structure, the constituent lamina blanks may be varied as to, for example, number of layers, and/or chemical composition of each layer. In working embodiments directed to making the intermetallic during process steps used to also make a device, or component thereof, by microlamination each of the layers of a lamina blank comprised one substantially pure single metal.

However, if an intermetallic blank (a non-patterned raw material from which a lamina is patterned, and can be in a sheet form referred to as a foil) is patternable by, for instance, machining, pressing, folding, twisting, shrinking, stretching, deforming, and combinations thereof, that intermetallic compound may be formed into a layer for inclusion in a lamina or laminae that are to become part of the final monolithic structure. Methods for making and processing single crystal intermetallics are now becoming known. Foils of single-crystal intermetallics have been patterned and used to make devices, one embodiment of which is described in Example 7. For example, $Ni_3Al$ has been made by cold rolling. See, for example, Demura et al., "Ductile Thin Foil of $Ni_3Al$," *Mechanical Properties of Structural Films*, (2000), which is incorporated herein by reference. Example 4 provides additional detail concerning a method for making a thin foil of a single crystal of $Ni_3Al$.

One benefit of the disclosed embodiments for making devices using such single-crystal materials is the ability to produce a high temperature microchannel device with intricate internal features from a normally brittle material. The single crystal material can be converted to a polycrystalline material during heating and/or pressure application involved with the microlamination process. Thus, the single crystal material can be patterned to form laminae. Single crystal laminae are bonded together and can be converted, if desired, to a polycrystalline material to obtain, for example, a complex microscale device with internal features.

In block 106 lamina blanks can be patterned. "Patterning" means changing the lamina blank from its initial geometric shape, topology, topography, or combinations thereof. For example, patterning may include, but is not limited to, formation of apertures or channels, such as by removing material through machining, making deviations in or from planarity (such as curved surfaces), and formation of geometric shapes, such as cylindrical, spherical, polygonal, and conical. Patterning techniques may include, but are not limited to, machining, pressing, folding, twisting, shrinking, stretching, deforming, and combinations thereof. Machining techniques may include, but are not limited to, laser ablation, chemical etching, lithographic techniques, plasma etching, mechanical abrasive flow methods, such as particle beams and sand blaster, high pressure hydraulic cutters, electromechanical or electrochemical methods, ultrasonic techniques, electromagnetic means including momentum transfer and energy transfer from any portion of the electromagnetic spectrum, including X-rays and gamma rays, wire and ram electrodischarge machining (EDM), waterjet and abrasive waterjet, precision plasma cutting, and combinations thereof, or other machining means commonly known to persons of ordinary skill in the art.

In block 108, the patterned laminae are fixed relative to one another, such as by being stacked and registered. "Registering" or "registration" generally refers to orienting and/or aligning two or more objects, such as laminae, or features on adjacent lamina, such as apertures, channels, etc., with respect to one another. Registration may be accomplished mechanically using a registration jig. Alternative methods of registering the laminae include, but are not limited to, an interferometer utilizing laser, ultrasound, light, microwave, or other wave source, alignment tools utilizing one or more of mechanical, electrical, electromagnetic, acoustic, and particle beam techniques, and combinations thereof.

A particularly useful technique for registering plural laminae for microlamination has now been developed, and is referred to as thermally enhanced edge registration (TEER). Differences in the thermal expansion of laminae relative to a fixture are used to produce a registration force on the laminae at the bonding temperature. Plural laminae are positioned properly on a fixture having a smaller coefficient of thermal expansion than the material used to make the laminae. At room temperature, a clearance allowance allows the laminae to be positioned easily on the fixture. At an elevated temperature, the laminae have expanded more than the fixture. The laminae therefore interact with the edge of the fixture, or pins on the fixture, thereby producing a registration force.

The clearance required for a particular registration process can be calculated. When heated, the device expands, and its new length is provided by Formula 1:

$$L_2 = L_1 + \delta L_1 = L_1(1 + \alpha_1 dT) \quad \text{Formula 1}$$

The slot in the fixture also expands, and the new width is provided by Formula 2:

$$L_4 = L_3 + \delta L_3 = L_3(1 + \alpha_2 dT) \quad \text{Formula 2}$$

With reference to Formulas 1 and 2, $L_1$=the device length before thermal expansion; $L_2$=the length subsequent to expansion; $L_3$=the width of the slot in the embodiment of the fixture used before thermal expansion; $L_4$=the width of the slot subsequent to thermal expansion; $\alpha_1$=coefficient of linear thermal expansion for the laminae material; $\alpha_2$=the coefficient of linear thermal expansion for the fixture material; and dT is the difference in bonding and room temperature.

For TEER, the expanded device length and the expanded width of the fixture slot should be substantially the same so that the laminae edges contact the boundary, and the thermal registration force is applied to the laminae edges. Thus, $L_2 = L_4$. The width of the slot therefore is provided by Formula 3:

$$L_3 = L_2/(1+\alpha_2 dT) = L_1(1+\alpha_1 dT)/(1+\alpha_2 dT) \quad \text{Formula 3}$$

Examples 1 and 2 provide further detail concerning the TEER process.

In block 110, at least certain of the stacked and registered laminae are fixed relative to one another, such as by being tack-bonded together, rendering the laminae fixed in position with respect to one another. Tack-bonding can be done over the entire surface of the laminae, or only at selected regions, such as at the outer edges, or at various regions on the surfaces of the laminae. Tack-bonding preferably is accomplished using adhesives, such as cyanoacrylate, which are combusted during processing. Fixing laminae relative to one another also can be accomplished using TEER.

In block 112, the lamina stack is converted, generally by heating, to a monolithic structure, which may be wholly intermetallic, or may comprise an intermetallic portion. Heating may be done at a temperature sufficient to form the desired intermetallic, such as from about 500° C. to about 1100° C. for the disclosed embodiments. And, heating may be accomplished by any suitable method, such as through conduction, convection, radiation with electromagnetic waves through the use of electrical resistance, inductive heater, laser or other sources of electromagnetic waves, acoustic waves, particle beam bombardment, mechanical means, or other means commonly known to persons of ordinary skill in the art. Heating may occur in an atmosphere of reduced pressure and/or inert gas atmosphere.

Without being limited to theorys of operation, conversion to an intermetallic may occur through liquid phase bonding, wherein at least one of the metals becomes liquified and diffuses into the other adjacent metals. In such a case, care must be taken to minimize the initial clamping force used to fix the laminae relative to one another. Too much initial pressure can break native oxide coatings (especially in the case of aluminum) on the outside of the metal which prohibit the liquid phase from losing shape. Once the liquid phase has been completely absorbed, the pressure may be increased for final diffusion bonding to eliminate voids in joints between laminae. For 25 mm ×25 mm device sizes, initial clamping pressures for NiAl formulations must be kept less than 50 psi at 1000° C. in order to not break native oxides. Typically it has been found that for NiAl formulations, most of the liquid has been absorbed by the fourth hour of a 10 hour bonding cycle.

Conversion to an intermetallic also may occur through solid-state diffusion bonding, wherein the temperature of the stack is less than the melting temperature of any of the metals within the stack, but the temperature is sufficient to facilitate diffusion, which occurs among layers in intimate contact with adjoining layers. Conversion to an intermetallic also may be accomplished through other mechanisms of bonding known to persons of ordinary skill in the art.

Figure 2:
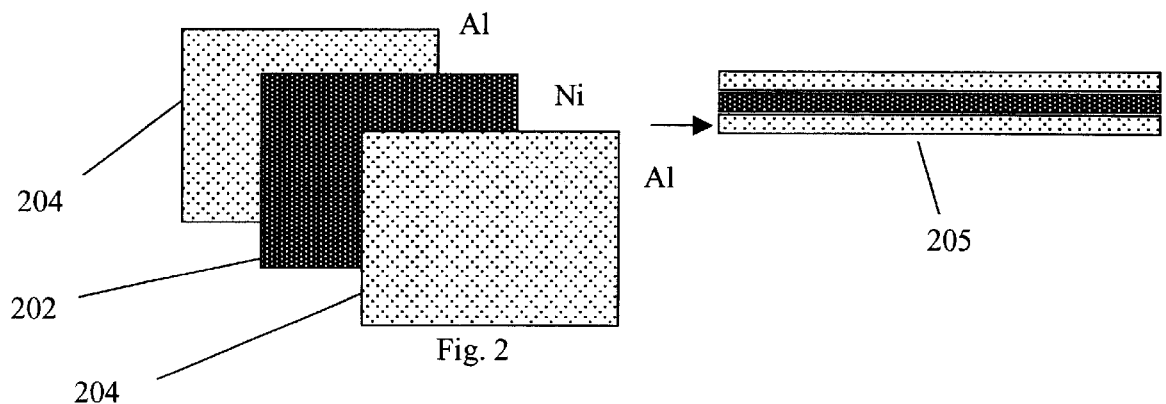
FIG. 2 illustrates the formation of one embodiment of a lamina blank.

FIG. 2 shows one embodiment of a lamina blank 205. In general, a lamina may comprise any number of layers, and may be a planar or a non-planar shape, i.e., curved, such as cylindrical, spherical, saddle-shaped, conical, hemispherical, or, in general, any non-planar shape. In the embodiment of FIG. 2, three layers comprise the starting materials. In this embodiment, a center layer 202 was a substantially pure nickel (Ni) metal, while each of two outer layers 204 were substantially pure aluminum (Al) metal. The three elemental layers were tack bonded together to form the composite lamina blank 205. Alternatively, multiple layers can be formed by physical vapor deposition or chemical vapor deposition of one or more metals onto a layer of another metal.

Layers 202 and 204 were surface-prepared to remove dirt, grease and oxides, and then tack bonded. Tack bonding involved placing the layered stack of 202, 204, in a vacuum hot press and subjecting the stack to a temperature and pressure for a period of time sufficient to fix the layers to, or at least relative to, one another in a stack, while the layers remained in their substantially pure metallic state. This generally means heating to a temperature of from about 25° C. to a temperature below the lowest melting temperature of the various metal layers, (in the case of Al—Ni laminae, below a temperature of about 660° C.), under a pressure typically of from about 0 psi to about 30,000 psi, and more typically from about 1 psi to about 1,000 psi. A working embodiment for making a NiAl structure used a temperature of 500° C. and a uniform pressure of 1,000 psi over the largest outer surfaces of the stack, in a direction orthogonal to the major surfaces of the stack, for a total of 15 minutes. The resultant composite lamina blank comprised, in this embodiment, aluminum and nickel in their substantially elemental state, though spatially fixed in relation to one another in a layered configuration.

Figure 3:
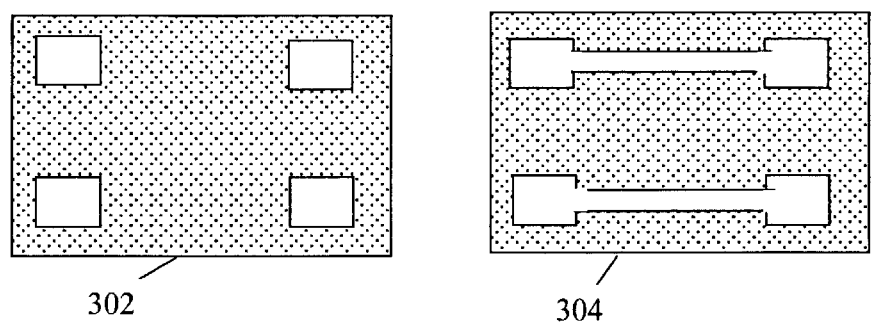
FIG. 3 illustrates examples of patterned laminae.

After lamina blanks have been produced, each lamina blank, or a necessary number required for forming a given monolithic structure, is patterned as exemplified in FIG. 3. A lamina blank, comprising a set of tack-bonded layers, typically is patternable, as each of the substantially pure metal layers (or patternable intermetallic layers) is patternable. The tack-bonding process typically does not change the chemical composition of the layers, nor does it form a non-patternable intermetallic throughout that portion of the lamina blank which must be patterned. Hence, though the characteristics of each metal may be different, and therefore careful attention needs to be paid to the patterning process, the lamina blank as a unit can be patterned, being a tack-bonded composite of metal layers, at least one of which is patternable. Typically one or more of the patterned laminae will have some type of machining, such as removal of metal through machining or placement of an incision into an edge, prior to further processing.

Figure 4:
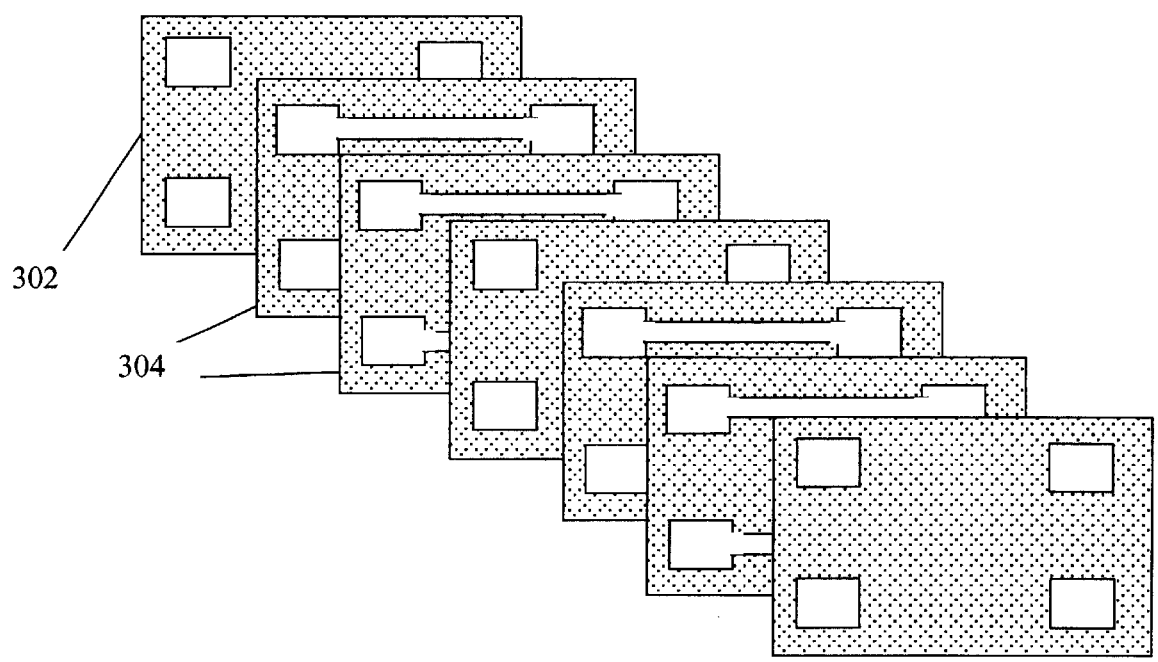
FIG. 4 illustrates a set of ordered patterned laminae to be stacked.

FIG. 3 shows a lamina 302 patterned into a shape referred to as a "fin," and a lamina 304 patterned into a shape referred to as a "channel." Each of the depicted shapes was patterned by removing metal according to the specification of the final monolithic structure. For instance, in one embodiment for which the final structure serves as a heat sink, the monolithic structure needed a stack having one fin 302 followed by two channels 304, with that order repeated, as illustrated in FIG. 4.

Figure 5:
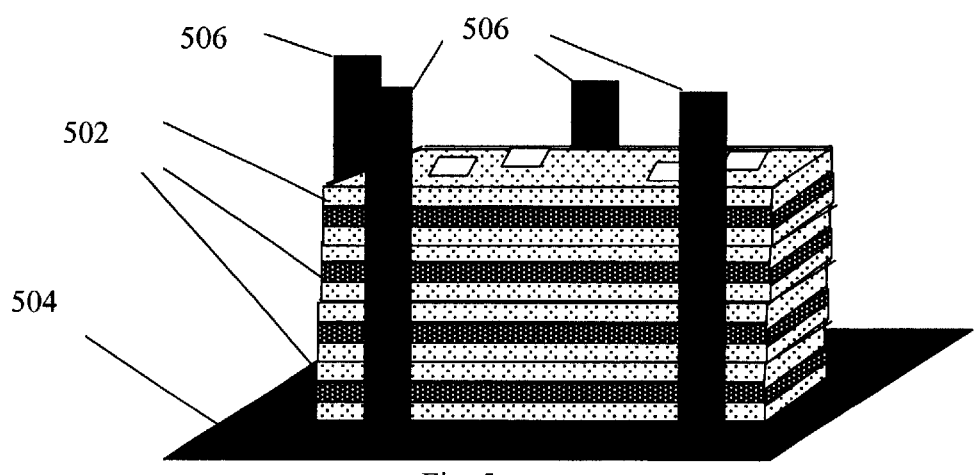
FIG. 5 illustrates a set of patterned laminae stacked in a registration jig.

Patterned laminae are stacked in the order needed to produce the geometry, topology and topography of the final monolithic structure. FIG. 5 shows one embodiment of a set of patterned laminae 502 stacked on a registration jig 504. The registration jig 504, including upright guides 506, aligns the laminae 502 with respect to one another to define the desired monolithic structure.

Figure 6:
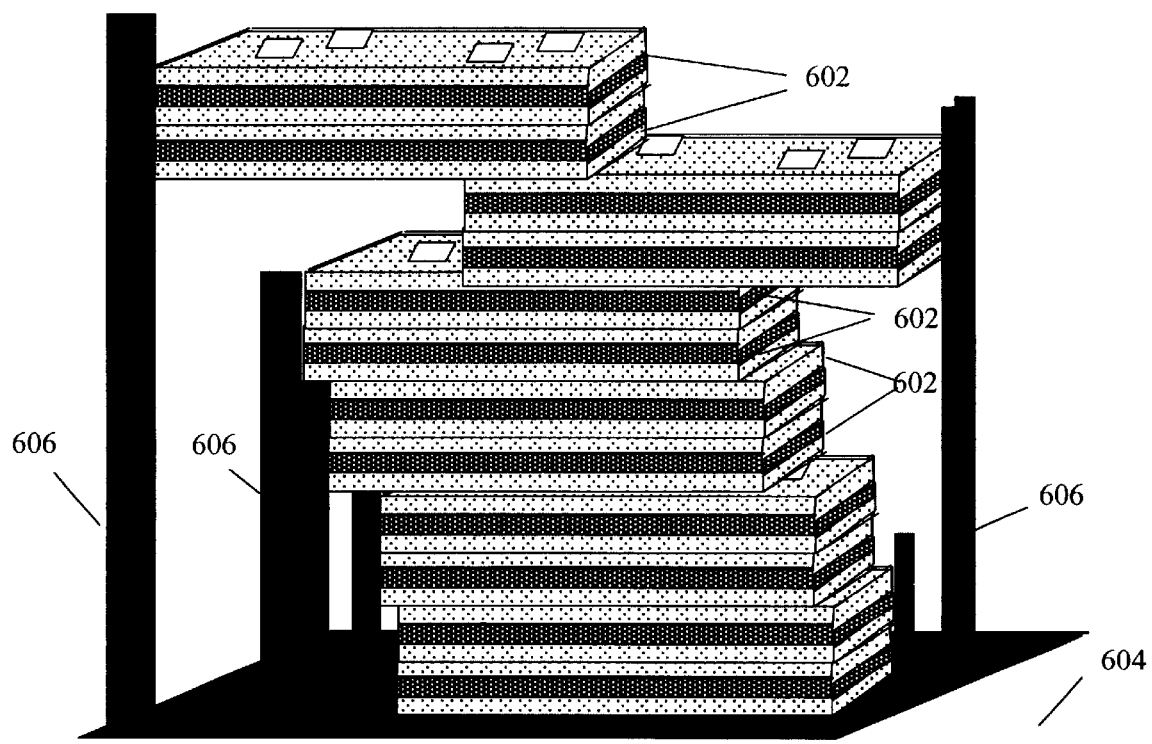
FIG. 6 illustrates a set of patterned laminae stacked and aligned in pairs.

If the geometry of the final structure is, for instance, other than a rectangular parallel channel device, it may be desirable to register subgroups of laminae. As illustrated by FIG. 6, for example, it may be desirable to have the laminae registered in pairs 602, each pair being offset from the others within the structure. Registration jig 604 with upright guides 606 may be configured to register laminae having this arrangement, as well as other arrangements, for such a structure.

Figure 7:
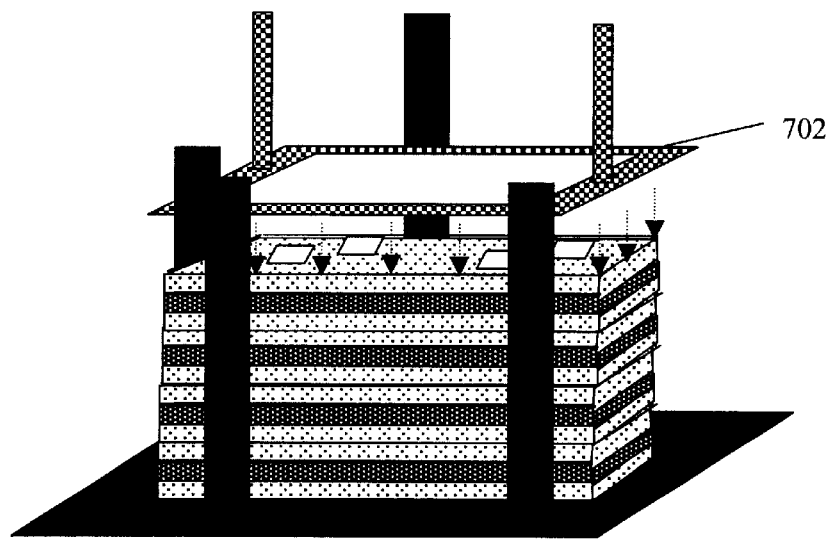
FIG. 7 illustrates tack bonding stacked, registered and patterned laminae.

When stacked and aligned, the laminae are then all, or at least in part, rendered invariant in position with respect to one another. This can be accomplished by attaching the laminae together, or at least attaching a subset of laminae together. In one embodiment shown in FIG. 7, attaching the laminae together was accomplished by bonding using a vacuum press 702 to apply pressure of from about 0 psi to about 30,000 psi, typically about 700 psi, and generally at elevated temperatures from about 25° C. to a temperature below the lowest melting temperature of the various metal layers for a limited time period, generally of from about 0.2 hour to about 1 hour, sufficient to tack-bond the laminae. In an embodiment comprising aluminum/nickel/aluminum laminae, this bonding step has been successfully accomplished at 400° C. and 700 psi for 15 minutes.

Laminae can be attached by other means. For example, in another embodiment, attaching the laminae to one another was accomplished using an adhesive such as cyanoacrylate. Adhesive was applied to at least the edges of the laminae and bonding accomplished under pressure at room temperature.

An aspect of a described embodiment comprises converting a set of stacked laminae to a structure that includes an intermetallic compound. This is typically accomplished by heating the entire stack at a temperature and for a period of time sufficient to form the desired structure.

Initially the stack is heated to a plateau temperature by raising the temperature of the stack at a rate typically in the range of from 0.1° C./minute to 100° C./minute. A typical range of plateau temperatures is from about 300° C. to about the melting temperature of the intermetallic that will be formed; in the case of Ni—Al, that temperature is 1,640° C. The period of time for conversion can be in a range from about 0.25 hours to about 100 hours. Homogenous intermetallic materials can be formed, and may be preferred for particular applications. Alternatively, only a portion of two adjacent layers may form an intermetallic so that there is either a discrete metallic/intermetallic boundary, or a gradient that extends from substantially pure metal to substantially homogeneous intermetallic.

In one embodiment, a lamina stack comprising laminae of Al and Ni layers was heated at 1,000° C. for 10 hours under reduced pressure. The result was a monolithic structure with the desired topological, topographical and geometric features. In this case, the intermetallic compound formed was NiAl.

II. Variations in Monolithic Intermetallic Structure Preparation

Processing temperatures may vary for forming particular intermetallic or metal/intermetallic materials. Temperatures are selected based on considering minimum temperatures to form an intermetallic material, such as temperatures close to, or at, the melting point of the constituent materials, or at temperatures lower than the melting point, but still resulting in intermetallic formation within a period of time reasonable for commercial applications. Such times typically are from about 0.2 hours to about 100 hours. In addition to liquid-phase bonding, solid state diffusion bonding can be employed to form an intermetallic, wherein the processing temperature is lower than the melting temperature of any of the constituent metals. Differences in the makeup of lamina blanks (number of layers per lamina, the order of metals in one lamina), may also necessitate changes in processing parameters to achieve optimal bonding, as well as optimal conversion to a monolithic intermetallic structure.

For intermetallics that can be shaped through machining and other patterning techniques that may include chemical as well as physical material removal at room temperature or at an elevated temperature, one or more patterned intermetallic layers may be incorporated within a set of laminae that will be processed to form a monolithic structure. Such incorporation of patterned intermetallic layers in a monolithic structure may be advantageous, for example, when a post is desired to provide structural support. Processing of the lamina stack may proceed via liquid-phase bonding or solid state diffusion bonding.

In another embodiment, a monolithic intermetallic structure may be formed starting with patternable intermetallic sheets some of which are machineable, patterning the sheets through machining and other patterning techniques, stacking and registering the patterned intermetallic sheets, and diffusion bonding the stacked and registered sheets to form a monolithic intermetallic structure. In order to ensure that the sheets will not crack as a result of the bonding pressure, the sheets are first heated to a plateau temperature for diffusion bonding, and then bonding pressure is added. Since many intermetallics have high fracture toughness at elevated temperatures, pressure applied to the stacked and registered sheets after they have been raised to the diffusion bonding temperature will, in many cases, avoid crack formation in the layers.

In yet another embodiment, multi-layered laminae are patterned and then converted, through application of heat and pressure, to produce a plurality of patterned intermetallic layers. The patterned intermetallic layers are then stacked and registered, and the stack is then diffusion-bonded to produce a monolithic intermetallic structure.

It may be advantageous to form a single monolithic structure from a variety of intermetallics. In order to do so, it may be necessary to form several types of lamina blanks from different combinations of metals. The conversion process would then result in several different intermetallics within the same monolithic structure.

It may be advantageous to have a monolithic structure of which only a portion is intermetallic in makeup. Such a structure can be realized through appropriate choice of laminae and registration thereof.

A. Applications

The present invention can be used to form a myriad of devices having varying structures and topologies. Certain embodiments of such devices are described in applicants prior patent documents, including U.S. patent application Ser. No. 09/369,679, entitled "Microlamination Method for Making Devices," and U.S. patent application Ser. No. 60/095,605, entitled "Methods for Making Devices by Component Dissociation and Microprojection Welding".

1. Chemical Reactors

Monolithic intermetallic structures can be used as a chemical reactor. This embodiment typically involves placing catalysts adjacent to surfaces of the structure, such as affixing or embedding catalysts on the internal surfaces, such as apertures, patterned within. The structure formed allows fluids, including compressible fluids, to pass through a set of apertures that comprise the internal passageways of the structure. The internal surface area, when coated with catalytic material, can serve to promote one or more chemical reactions that can occur under specific conditions, such as high temperature. Intermetallic compounds may be formed that provide good compatibility with, or possess good adherence characteristics for, the reaction catalysts needed. Intermetallics may be alloyed with catalytic metals, providing a significant benefit as a choice for a catalytic microreactor substrate. An intermetallic compound also may be selected that possesses desired heat characteristics, such as high melting temperature and low thermal conductivity, to form a chemical reactor. One such chemical reactor may have a high surface area for exposing the reactants to the catalytic material, physical characteristics such that the structure will not melt or deform over time, and, as a result of low thermal conductivity, not significantly reduce the temperature of the desired chemical reaction.

Figure 8:
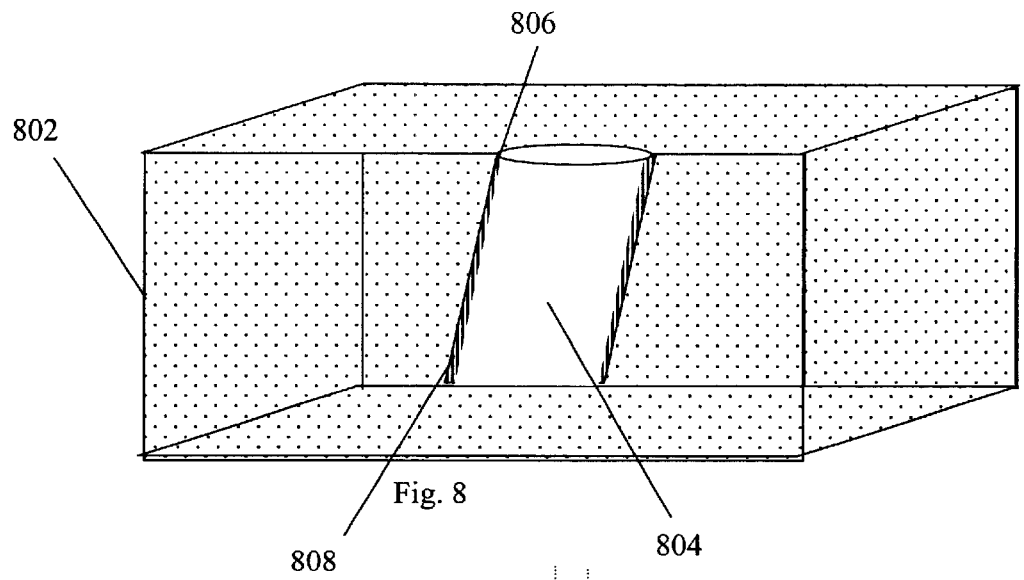
FIG. 8 illustrates a catalyst fixed to the surface of an inner feature of a monolithic structure, such as an intermetallic structure.
Figure 9:
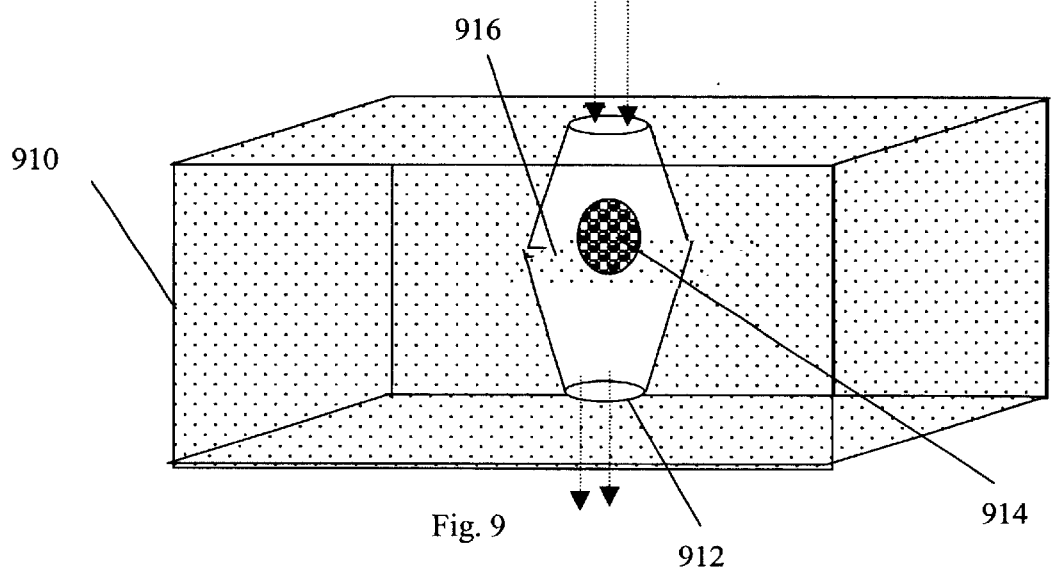
FIG. 9 illustrates a catalyst positioned on a support within a monolithic structure.
Figure 10:
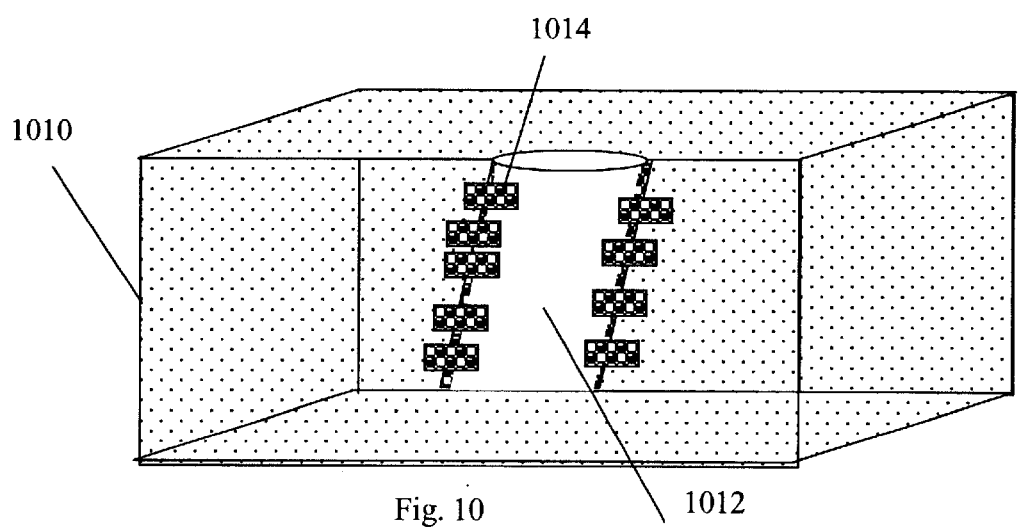
FIG. 10 illustrates a catalyst embedded in a surface of an internal feature of a monolithic structure.

Other embodiments having catalysts include, but are not limited to:

catalytic material(s) applied to the internal or external surfaces of an intermetallic structure such as a microstructure. FIG. 8 shows a monolithic intermetallic structure 1702 which defines a fluid pathway 1704. Wall 1706 is exposed to fluid flowing through the fluid pathway 1704. Positioned adjacent to, affixed to or embedded in wall 1706 is a catalyst 1708 that may come into contact with fluids flowing through the pathway 1704.

catalytic material(s), held within the structure, that may come into contact with reactants passing through the structure. FIG. 9 illustrates a monolithic structure 910 that defines a fluid pathway 912. A catalyst 914 may be positioned within the fluid pathway 912, but is not affixed to nor embedded within the wall defining the fluid pathway 912. For example, the catalyst may be supported by a structure, such as a screen 916, which may be formed as part of making the monolithic structure, on which catalyst 914 rests. A fluid passing through the fluid pathway 912 can contact the catalyst 914 to promote a desired chemical reaction among the constituents of the fluid.

a catalyst embedded in the surface of portions of the structure. FIG. 10 illustrates a monolithic structure, such as an intermetallic structure 1010, that defines a fluid pathway 1012, the side walls of which have been embedded with catalytic material that extends beneath the surface of the fluid pathway 1012. Should the catalyst become eroded due to exposure to continued contact with the reactants flowing through the structure, this arrangement maintains the presence of the catalyst in the reaction path for a prolonged period of time.

Various catalytic materials may be used. For example, and without limitation, finely divided metals such as platinum and palladium, carbon, enzymatic materials, and combinations thereof may be used.

Other methods for including catalytic material into the monolithic intermetallic structure are also within the scope of this disclosure.

2. Materials with Special Properties

Monolithic intermetallic structures can be made by selecting materials based on magnetic properties, such as magnetic susceptibility. Still other applications may take advantage of other properties of intermetallics, for example, but not limited to, electrical conductivity, superconducting transition temperature, heat capacity, thermal conductivity, chemical reactivity, and are included within the scope of this application.

3. Microchannel Arrays

Microchannel arrays made using the disclosed fabrication process provide a number of advantages in addition to size including, for example, high surface-area-to-volume ratio for substances passing through the structure. The additional surface area is provided by the internal passageways defined by the topology and geometric configuration of the monolithic structure. Microchannel arrays are particularly useful for making portable devices, such as portable microchemical reactors, portable fuel cells, portable air purification systems for use where the air is highly contaminated with noxious substances, high temperature heat exchangers, and other miniaturization applications.

Macroscopic devices also can be formed where a very high surface area-to-volume ratio is desired. In the latter case, a bank of microchannel array structures can serve a macroscopic application.

4. Macrochannel arrays

Macroscopic devices using a large-scale, monolithic, intermetallic structure may be preferable to microchannel arrays. For example, a macroscopic device may be preferable in a large-scale, heat-recovery application, e.g., exhaust heat stack, where a large cross-sectional area must be traversed, and where performance of the device utilizing the structure is not significantly improved through a very high internal surface area-to-volume ratio. Fabricating macroscopic, large-scale, monolithic, intermetallic structures uses the same general fabrication methodology disclosed herein, with the possible need for modifications to accommodate increased size, such as to avoid deformation of the internal geometries due to material sag during fabrication.

Material sag may be prevented by using features such as posts, which support long spans of laminae. These techniques also may be applicable to smaller geometries such as microreactors and meso-scale devices.

Figure 11A:
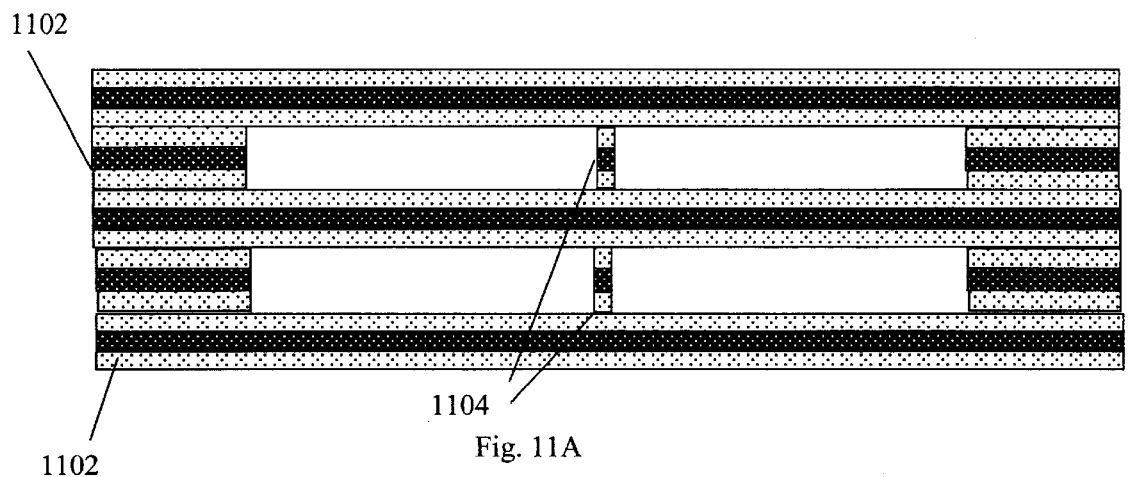
FIG. 11A, B illustrate a lamina stack with posts bridging plural laminae.
Figure 11B:
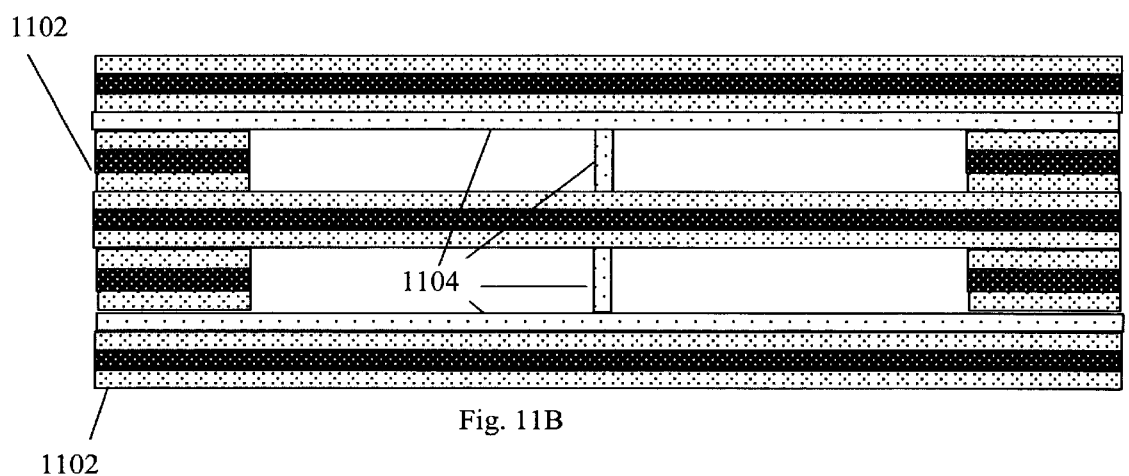
Figure 12:
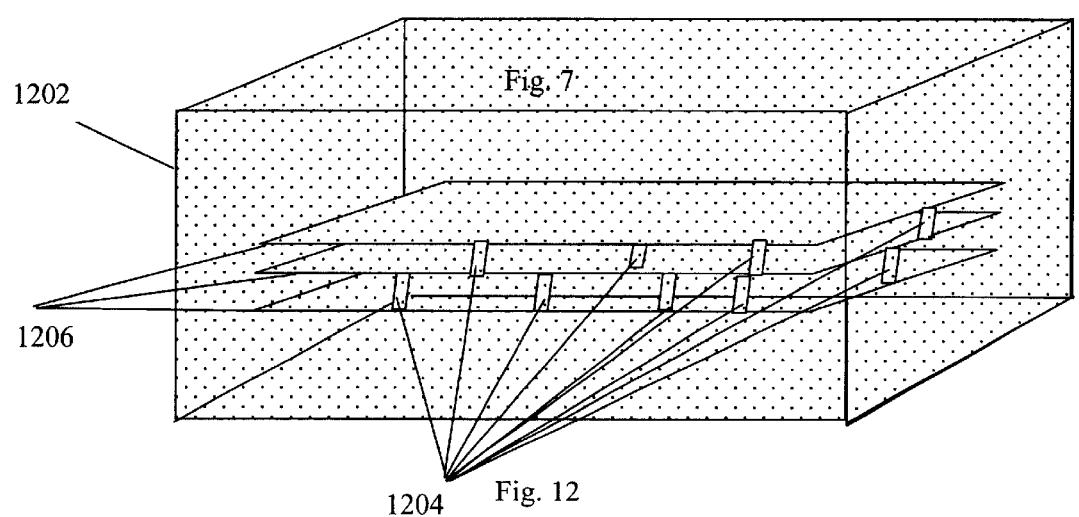
FIG. 12 illustrates a monolithic structure with posts bridging plural lamina.

FIGS. 11A and 11B show a stack of patterned laminae, with a lamina 1102 comprising three metal layers. In between alternate laminae are one or more posts 1104, that provide structural support, and also transmit pressure between laminae. A post can be formed as a feature machined into a lamina, i.e., blind machined feature as in FIG. 11A. Alternatively, the illustrated posts 1104 can be made starting from a lamina and machining away the excess to form a post 1104 as in FIG. 11A, the lamina comprising a sandwich made up of a plurality of metals, or posts 1104 in FIG. 11B can be made from a machineable intermetallic material. FIG. 12 illustrates the stack after conversion to a monolithic intermetallic structure 1202, with posts 1204.

B. Topological/Geometrical Variations

Figure 13:
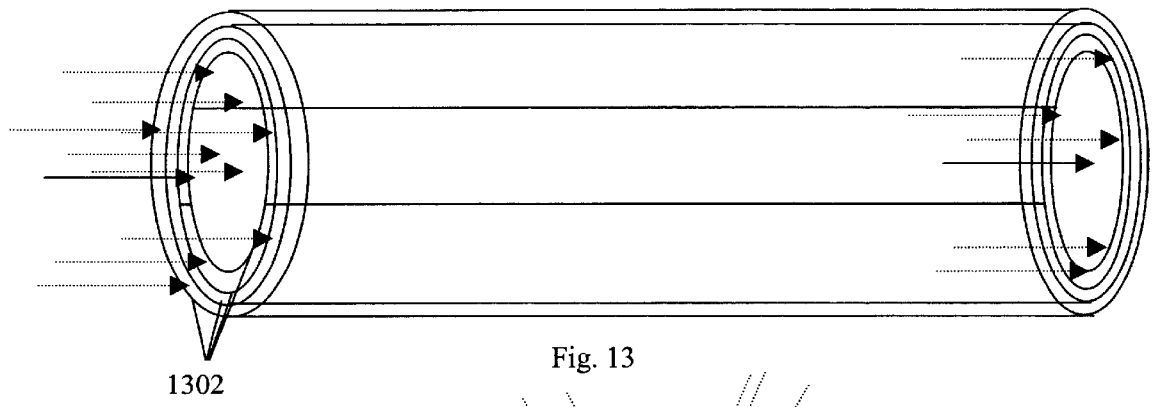
FIG. 13 illustrates a monolithic structure with cylindrical features.

The disclosed embodiments can be generalized to other topologies and geometries, which may be preferable for specific applications. For example, FIG. 13 illustrates using concentrically, or substantially concentrically, registered cylindrical laminae 1302. Laminae 1302 comprising an aluminum-nickel-aluminum sandwich can be heated to temperature of from about 300° C., to about 1,640° C., to form a homogeneous, or substantially homogeneous intermetallic, a discrete intermetallic/metal boundary, or a gradient from one substantially homogeneous metal through an intermetallic to another substantially pure homogeneous metal.

Figure 14:
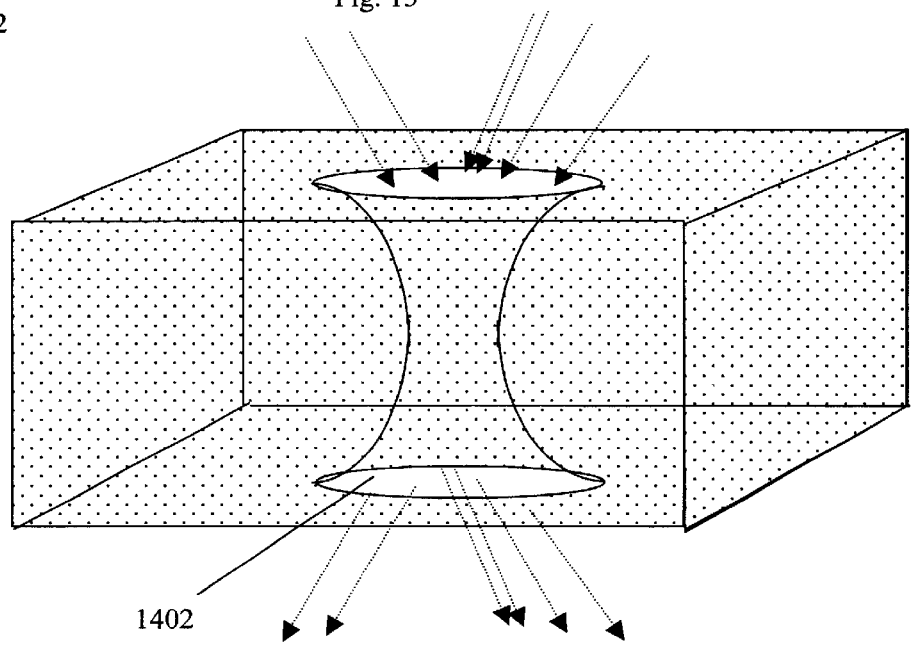
FIG. 14 illustrates a monolithic structure defining an aperture having a variation in cross-sectional area.

FIG. 14 illustrates a device having a variable cross-sectional area 1402 within the internal geometry. The design illustrated by FIG. 14 creates regions of high fluid velocity.

Figure 15:
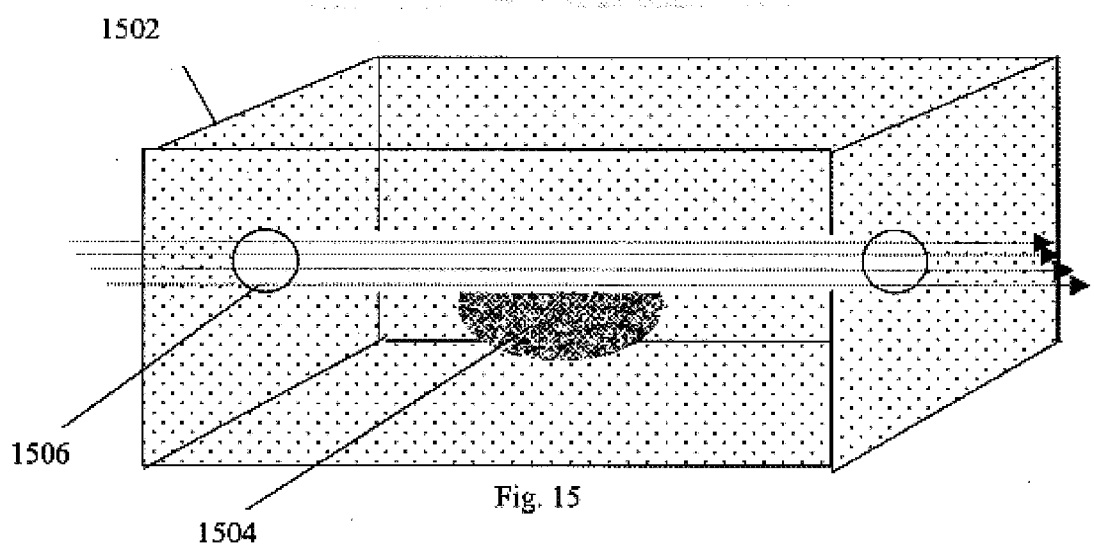
FIG. 15 illustrates a monolithic intermetallic structure defining a well, holding e.g., catalytic material, adjacent a flow-through aperture.

FIG. 15 illustrates a well 1504 within a structure 1502 that serves as a reservoir for a fluid, particularly a liquid reactant. The reactant is allowed to come into contact with fluids passing through a fluid pathway 1506 within the structure 1502.

Figure 16:
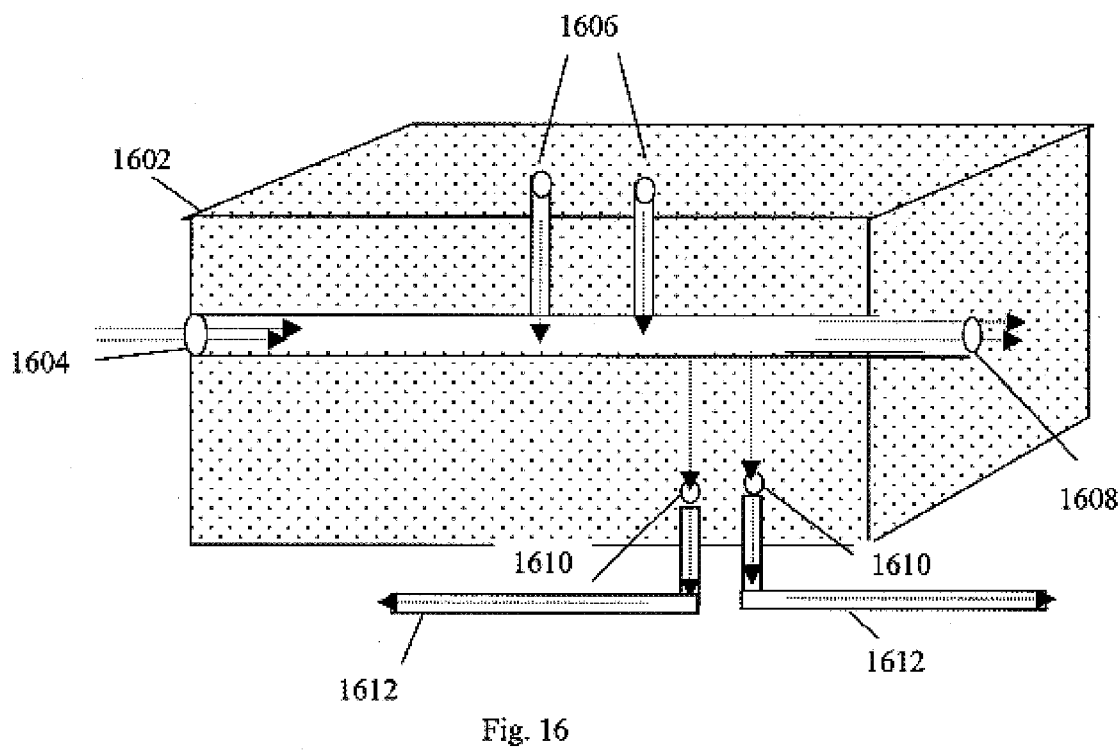
FIG. 16 illustrates a monolithic structure having multiple input/outputs ports and plural flow apertures.

FIG. 16 illustrates a monolithic intermetallic structure 1602 having a main input 1604 and auxiliary inputs 1606 for injection of a reactant at a particular point in the primary substance's path through the structure. Structure 1602 also includes a main output 1608, auxiliary outputs 1610, and exhaust ducts 1612, to enable, for instance, pressure reduction at a particular point in the substance's path. Other geometries and topologies may be considered, and fall within the scope of this disclosure.

Structures may be fabricated that comprise substructures, some of which may be intended to be freely moveable within the structure after fabrication. The substructures are coupled during fabrication to internal members and other substructures by fixture bridges, which are removed after fabrication of the intermetallic is complete. Fixture bridges, and the use thereof, are described in U.S. patent application Ser. No. 09/369,679, entitled "Microlamination Method for Making Devices." For such structures intermetallics may be advantageous, due to their physical properties, such as low thermal conductivity and high melting temperature.

The following examples are provided to illustrate certain features of the present invention. The scope of the invention should not be limited to those features exemplified.

EXAMPLE 1

This example concerns designing and using a fixture for registering plural lamina by TEER. Stiffness is believed to be an important factor in determining whether stacked laminae are registered or buckled by the registration force applied during TEER. As a result, two factors, laminae thickness and device length, were varied. Two device sizes, 12.7 millimeters and 25.4 millimeters, and two laminae thicknesses 50.8 microns and 76.2 microns, were used.

Figure 17:
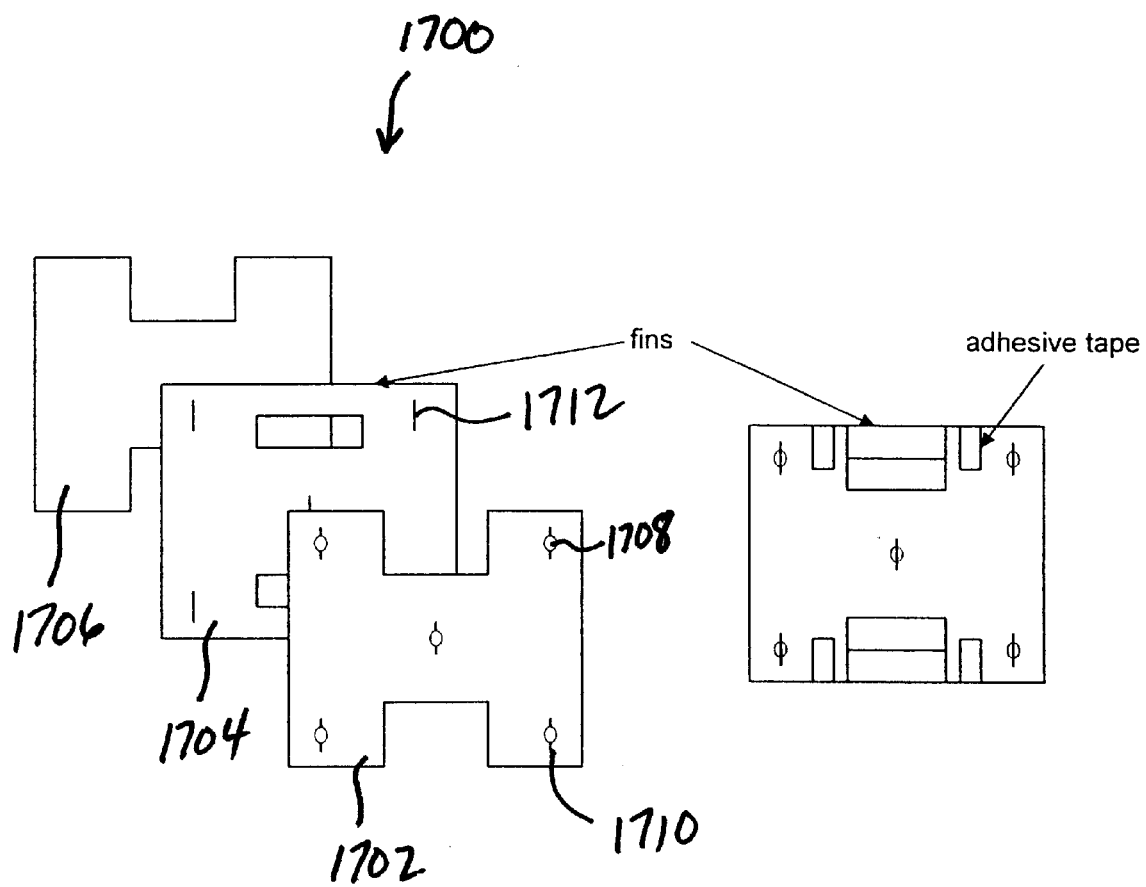
FIG. 17 is a schematic diagram of laminae used to evaluate factors influencing registration and buckling of laminae during thermally enhanced edge registration.

Microlamination was used to produce a test article 1700, as shown in FIGS. 17a and 17b. Test laminae 1702, 1704, 1706 were patterned from 304 stainless steel shim stock by laser ablation at the $4^{th}$ harmonic of an Nd:YAG laser (266 nm). Five windows 1708 were patterned on the laminae 1702 so that the alignment of the laminae could be determined visually. After patterning, the laminae 1702, 1704, 1706 were washed with acetone, ethanol and deionized water. The laminae 1702, 1704, 1706 also were cleaned in an ultrasonic cleaner using Citranox for about 20 minutes. The laminae 1702, 1704, 1706 were then rinsed again with acetone, alcohol and deionized water.

Figure 18:
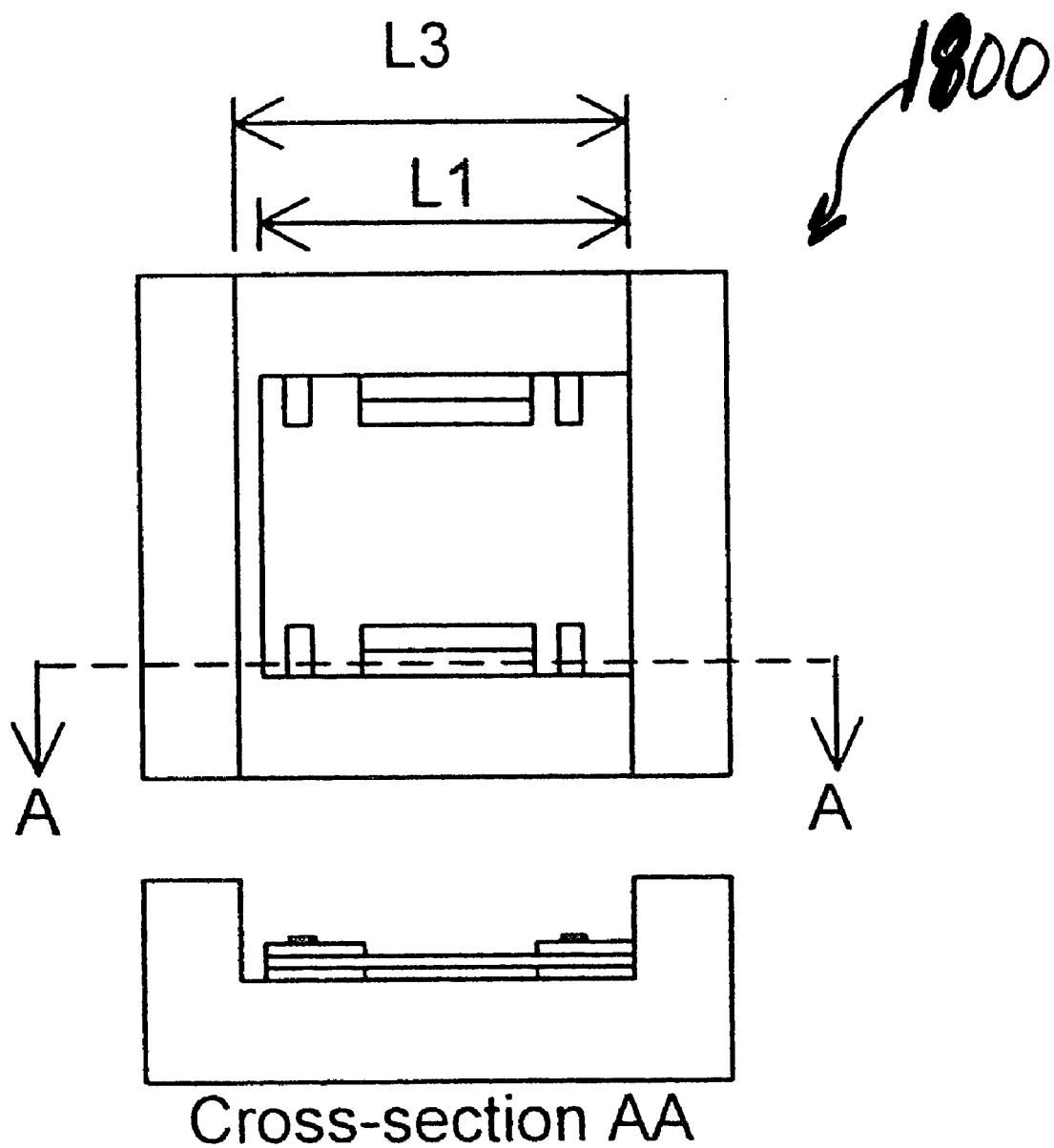
FIG. 18 is a schematic view of one embodiment of a registration fixture used for thermally enhanced edge registration.

The washed laminae 1702, 1704, 1706 were then positioned on a registration fixture 1800 as schematically illustrated in FIG. 18. The laminae 1702, 1704, 1706 were diffusion bonded in a vacuum hot press at 900° C. at 6.55 Mpa (950 psi) for two hours. The vacuum chamber was heated to the 900° C. bonding temperature before the bonding pressure was applied. This allowed the laminae edges to properly register before bonding. The bonding pressure was relieved before cooling so that the laminate could contract uniformly without any induced stress.

Layer-to-layer misalignment was measured and viewed on screen using a LEICA DML microscope coupled to a charge-coupled device (CCD) camera. The laminate was placed on the stage of the microscope and focused until the registration marks 1710, 1712 were clearly seen at 200× with a resolution of 0.3–0.4 microns. Line markers 1712 patterned on lamina 1704 could be seen through window 1708 etched in top lamina 1702 placed over a lamina 1704. The misalignment defined by the markers 1712 on the lamina 1704 relative to the marker on the lamina 1702 was measured optically. Misalignment for all positions viewable by the windows 1708 were then determined, resulting in eighty total measurements. Twenty of the eighty measurements were verified using SEM, and no statistically significant difference was seen between the two measurement methods.

An overall misalignment for the eighty measurements taken was 4.3 microns. The accepted misalignment standard is about 50 microns. Madou, "Fundamentals of Microfabrication" (1997). The averages for the tested combinations are provided below in Table 1.

TABLE 1

Misalignment errors achieved experimentally for different lamina thicknesses and channel spans.

| Device Length | Lamina Thickness | |
| --- | --- | --- |
| | 50.8 µm | 76.2 µm |
| 12.7 mm | 3.96 µm | 2.03 µm |
| 25.4 mm | 8.08 µm | 3.14 µm |

Table 1 shows that two variables may be important in determining alignment precision, laminae thickness and device length. For thickness, the thicker the lamina, the better the alignment. See Table 1 and compare the misalignments for 76.2 microns thick lamina to 50.8 microns thick lamina. Also, shorter laminae have reduced misalignment, as can be seen by comparing the results for lamina having a length of 12.7 mm and lamina having a length of 25.4 mm.

EXAMPLE 2

Surprisingly, it has been found that the precision obtained using TEER is better than that predicted when considering the precision of the fixture. For example, a graphite fixture (schematically illustrated by FIG. 18) was used for this example. The fixture was milled on a milling machine having a resolution of about 12.7 µm. However, the results presented in Table 1 show that precisions of less than about 5 µm are possible when using this fixture to practice TEER. In other words, registration with misalignments of less than about 10 microns, and typically less than 5 microns, are possible using a fixture having tolerances in the 10 s of microns.

Figure 19:
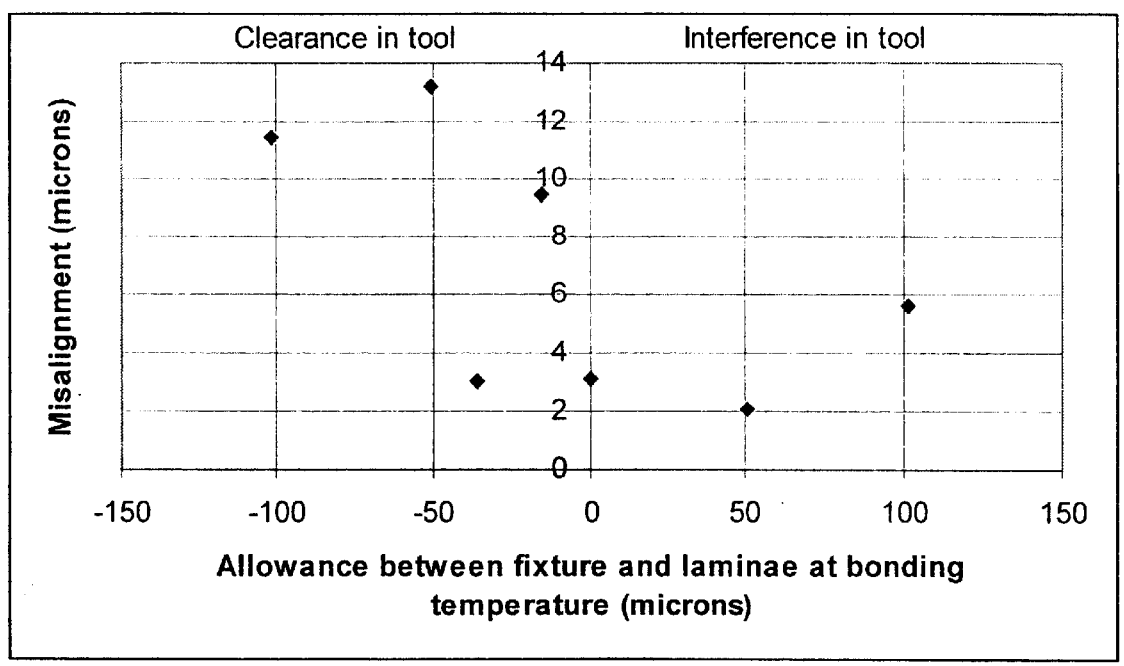
FIG. 19 is a graph of misalignment (microns) versus allowance between fixture and laminae at processing temperatures (microns).

This observation was tested by making devices of different lengths and registering the laminae necessary to make such devices using a fixture with a fixed length. FIG. 19 shows the results. The misalignment experienced remains constant over the interval of interference between the laminae and the fixture. The length of this interval is over 100 µm, which well exceeds the machine tool tolerance. The TEER process therefore can accommodate lower tolerances in the fixture relative to that desirable in the assembled monolithic device.

EXAMPLE 3

A NiAl intermetallic monolithic structure has been fabricated from Al and Ni starting materials. Lamina blanks were formed as in FIG. 2, using substantially pure Al foil (25.4×10–6 m. thick) and substantially pure Ni foil (50.8× 10–6 m. thick). The metal foils were cut into square layers of side 7.5×10–2 m.

The metals were surface-prepared. Specifically, each of the layers was cleaned with acetone. The Ni was then etched in a solution of 20% by volume HCl and 80% by volume distilled water. The Al was etched with a solution consisting of 50% by volume HNO3 and 50% by volume distilled water. Both metals were agitated in their respective etching solutions for approximately 5 minutes.

A lamina blank comprising one Ni layer sandwiched on either side by an Al layer was produced by low-temperature tack bonding in a vacuum hot press at 500° C. and 1000 psi for 15 minutes, at 10–4 torr pressure. Each lamina blank was patterned via laser ablation with an ESI 4420 Laser Micromachining System with a Q-switched 532 nm Nd:YAG laser rail. Patterned laminae formed included both fins 302 and channels 304, as in FIG. 3.

Patterned laminae were stacked according to the scheme shown in FIG. 4. Registration was accomplished using a fixture with three molybdenum fixturing pins that were used to locate the edges of the laminae, and a base made of graphite. The laminae were tack bonded adhesively with cyanoacrylate at room temperature, under pressure of 700 psi. Conversion of the laminae to an intermetallic compound was achieved by heat treating the tack-bonded stack in a vacuum oven. Laminae were synthesized and aggregated by self-propagating high-temperature synthesis (SHS) and subsequent heat treatment to homogenize the microstructure of each lamina in tandem with diffusion bonding the laminae collectively in a vacuum hot press at elevated temperature and pressure. The stack was positioned between two platens with minimal pressure (under 100 psi), and heated at a rate of 10° C. per minute to a temperature of 1,000° C. The sample was then held at this temperature for 10 hours, resulting in the desired monolithic intermetallic structure.

EXAMPLE 4

A NiAl intermetallic monolithic structure is fabricated from Al and Ni starting materials. Lamina blanks are formed as in FIG. 2, using substantially pure Al foil and substantially pure Ni foil. The metals are surface-prepared.

A lamina blank comprising one Ni layer sandwiched on either side by an Al layer is produced by low-temperature tack bonding in a vacuum hot press at 500° C. and 1000 psi for 15 minutes, at $10^{-4}$ torr pressure. Some laminae blanks are patterned. Conversion of the laminae to an intermetallic compound is achieved by heat treating each of the tack-bonded laminae in a vacuum oven. Laminae were synthesized and aggregated by self-propagating high-temperature synthesis (SHS) and subsequent heat treatment to homogenize the microstructure of each lamina in tandem with diffusion bonding the laminae collectively in a vacuum hot press at elevated temperature and pressure. The laminae are heated at a rate of 10° C. per minute to a temperature of 1,000° C. The sample is then held at this temperature for 10 hours, resulting in the intermetallic NiAl.

Patterned and unpatterned intermetallic laminae are stacked. Registra-tion is accomplished using a fixture. The laminae are tack bonded adhesively with cyanoacrylate at room temperature, under pressure of 700 psi. Conversion of the laminae to a monolithic intermetallic structure is achieved by diffusion bonding through heat treating the tack-bonded stack in a vacuum oven. The stack is positioned between two platens with minimal pressure (under 100 psi), and heated at a rate of 10° C. per minute to a temperature of between 1700° C. and 1,100° C. The sample is then held at this temperature for between 1 and 24 hours, resulting in the desired monolithic intermetallic structure.

EXAMPLE 5

Starting with intermetallic laminae, some laminae are patterned, through machining and other patterning techniques. For instance, the intermetallic compounds NiAl and $Ni_3Al$ can both be machined via chemical etching using a solution of $H_2O$ 25 mL, HCl 50 mL, $FeCl_2$ 15 g., and $CuNO_3$ 3 gram; the intermetallic compounds FeAl and $Fe_3Al$ can both be machined via chemical etching using a solution of 6 parts $H_3CCO_2H$, 4 parts $HNO_3$, and 2 parts HCl. Patterned and unpatterned intermetallic laminae are stacked and registered. Registration is accomplished using a fixture. The laminae are tack bonded adhesively with cyanoacrylate at room temperature, under pressure of 700 psi. Conversion of the laminae to a monolithic intermetallic structure is achieved by diffusion bonding through heat treating the tack-bonded stack in a vacuum oven. The stack is positioned between two platens with minimal pressure (under 100 psi), and heated at a rate of 10° C. per minute to a temperature of between 1700° C. and 1,100° C. The sample is then held at this temperature for between 1 and 24 hours, resulting in the desired monolithic intermetallic structure.

EXAMPLE 6

According to the method of Demura et al., rods of boron-free binary stoichiometric $Ni_3Al$ can be grown by the FZ method at a growth rate of 25 mm/hour. The crystal diameter is kept constant during the crystal growth to obtain high single crystallinity by controlling the lamp power. The grown rods can be sectioned into sheets along the growth direction by electric discharge machining. Sheets having a thickness of from about 1 to about 2 millimeters can be cold rolled to about 300 $\mu m$ in thickness using four-high mills with a work roll diameter of 110 millimeters. The sheets can be rolled a second time using cemented carbide rolls having a roll diameter of about 75 millimeters.

The above process was used to make foils. These foils were then patterned using a YAG:Nd laser. A crossover fluid flow laminate was then made by registering the patterned $Ni_3Al$ foils, registering the patterned foils by TEER, and converting the registered foils to a monolithic structure by applying heat and pressure to the stack.

EXAMPLE 7

Figure 20:
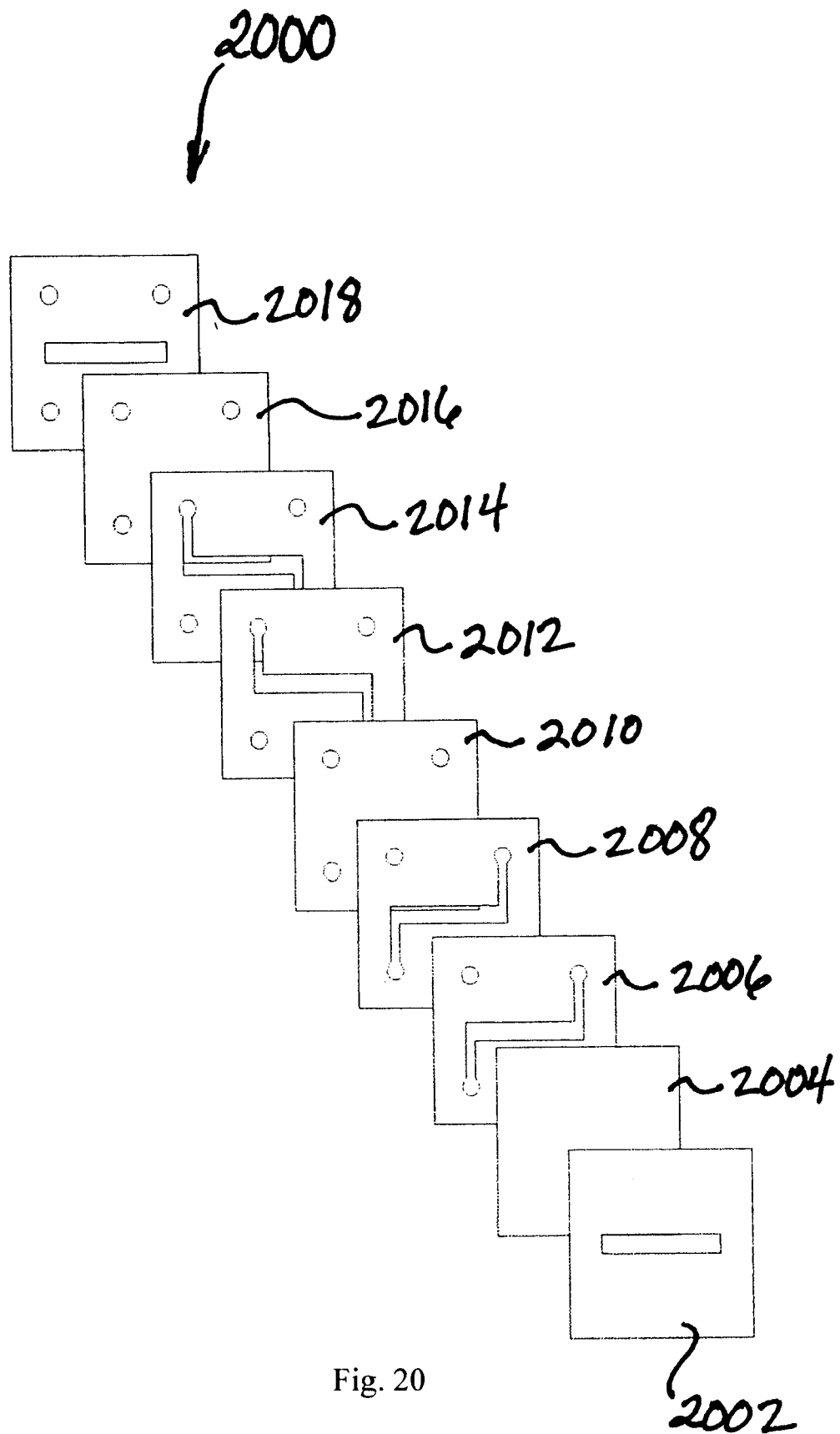
FIG. 20 is a schematic depiction of laminae used to produce a $Ni_3Al$ intermetallic counterflow heat exchanger.

FIG. 20 illustrates $Ni_3Al$ laminae used in a microlamination procedure to form a $Ni_3Al$ intermetallic microchannel geometry 2000. The procedure involved laminae patterning, laminae registration, and diffusion bonding of the laminae to produce a monolithic structure. The laminae were formed using 85 $\mu m$ thick $Ni_3Al$ foil acquired from Dr. Toshiyuki Hirano at the National Research Institute for Metals (NIMR) Japan. An ESI 4420 Laser Micromachining System with a 266 nm UV laser rail was used to produce a patterned lamina from the blank. Specifically, as illustrated by FIG. 20, the patterned laminae used to assemble the device included spacer 2002, end plate 2004, channel laminae 2006, 2008, fin lamina 2010, channel laminae 2012, 2014, fin lamina 2016, and spacer lamina 2018. The laminae 2002–2018 were registered using a thermally-enhanced edge registration (TEER) technique using a fixture having alignment pins to constrain the stack of laminae at the edges. The laminae 2002–2018 were diffusion bonded by heat treating the stack in a vacuum hot press at elevated temperature and pressure. The laminae 2002–2018 were positioned between two graphite platens applying 900 psi pressure and heated at a rate of 10° C. per minute to a temperature of 900° C. The laminae were held at this temperature for 40 hours to form the monolithic device. The device was leak tested under more than 1 atmosphere of air pressure under water. No leakage between the channels as well as along the edges of the device was observed.

EXAMPLE 8

This example concerns plating aluminum with electroless nickel after treating the aluminum foils with a Zincate process. The motivation behind this approach was to get rid $Al_2O_3$ by a Zincate process to improve the bonding of NiAi laminae. Electroless nickel plating was preferred to the conventional electroplating for its simple setup, ease of use and uniform deposition over the surface.

Aluminum forms an oxide layer when exposed to air. This presents a problem when plating aluminum, as the oxide layer prevents the plating solution from sticking to the surface. By using the Zincate process as a preplate dip, any oxide layer present may be chemically removed and at the same time a layer of zinc is applied onto the surface of aluminum foil. Zinc protects the aluminum until it is ready to be plated. As the part is lowered into the plating tank, the zinc is etched away by the nickel solution and plating proceeds onto a chemically clean surface.

Aluminum laminae were cut into 2.54 cm×2.54 cm blanks out of 50.8 $\mu m$ thick commercially pure aluminum foil. The blacks were cleaned using acetone then acid-etched with a 50% by volume solution of $HNO_3$ to remove native oxides. Single Zincate and double Zincate processes are known for preparing aluminum surface prior to electroless nickel plating.

The following steps were followed for the double Zincate process: (1) Non-etch soak clean; (2) rinse; (3) acid etch; (4) rinse; (5) desmut in nitric acid, 50%; (6) rinse; (7) Zincate—long immersion; (8) rinse; (9) strip in 50% nitric acid; (10) rinse; (11) Zincate—short immersion; (12) rinse; and (13) electroless nickel plate.

After following steps 1 to 6 for cleaning the aluminum surface, a 25% by volume Zincate solution, purchased from Caswell Inc., Palymra, N.Y., was made. Specifically, a 50 ml of Zincate was poured into a Pyrex beaker, which was subsequently filed to the 200 ml ark with distilled water. The solution was heated to 75° F. (~29° C.) on a hot plate. On acquiring the required temperature aluminum laminae were completely immersed into the Zincate solution for 2 minutes. A uniform gray appearance is usually a sign of a properly Zincated surface. Laminae were taken out of the solution and steps 8 to 10 were followed. Laminae were again immersed into the Zincate solution for 15 seconds, followed by steps 12 and 13.

Electroless nickel plating system was purchased from Caswell Inc. The system consists of 2 main ingredients, parts A and B. Parts A and B are mixed with distilled water to make the nickel plating solution. In order to make the solution, 25 ml of part A was mixed with 75 ml of part B in a Pyrex beaker. The beaker was then filled up to the 500 ml mark with distilled water. The Pyrex beaker was put on a hot plate having a built in agitator, and heated to 195° F. (~91° C.). After the solution acquired the desired temperature, aluminum laminae preplated with Zincated were deposited at the bottom of the container. During the plating procedure the container was constantly agitated with the built in agitator. The deposition rate for electroless nickel plating is about 25 μm per hour. Calculations for the required deposition of nickel on 50.8 μm aluminum to have 50 atomic % of nickel and aluminum were carried out. In order to have 50 atomic % of nickel and aluminum to form NiAl, a 33.65 μm thick deposition of nickel is required on 50.8 μm thick aluminum laminae. Both one sided and two sided plating methods were used. For one-sided plating, one side of every aluminum lamina was covered with pressure sensitive adhesive (PSA) tape. For one-sided plating, aluminum laminae were immersed in the nickel plating solution for about 92 minutes. For two-sided plating, laminae were immersed in the solution for about 45 minutes.

The electroless nickel plated aluminum laminae were rinsed with deionized water and dried. The laminae were placed in a graphite fixture having three tungsten pins for edge alignment. The inside surface of the fixture was lightly coated with magnesium hydroxide, to prevent the laminae from sticking to the fixture. The fixture was placed in a vacuum hot press with minimal pressure on the fixture (the hydraulic pump of the press was turned off). The pressure in the press was reduced to 10–4 torr. The laminae were converted to an intermetallic compound by heat treating the stack at a rate of 10° C. per minute to a temperature of 1,000° C. The sample was held at this temperature for 10 hours.

Zincating of aluminum laminae was accomplished successfully. In the case of two-sided Zincating a uniform gray appearance was observed on both sides of the laminae. In case of one-sided Zincating the Zincate solution impinged under the taped side along the edges.

Several unsuccessful attempts were made to counteract this problem with different tapes as well as photoresist deposition. The photoresist did not stand to the Zincate solution and was gradually dissolved. Also nitric acid was used as a Zincate stripper to get rid of the unwanted Zincate, but it somehow stripped the Zincate on the other side as well. Therefore, two-sided Zincating was preferred. After successful Zincating, laminae were obtained in 45 minutes. The surface was devoid of any puts or cracks, and the quality of adhesion to the laminae was good. Tape test was conducted to check the nickel adhesion to the surface.

A 609.6 μm thick stack of nickel plated aluminum was bonded in the vacuum hot press. Part of the converted laminae bonded with the tungsten pins, indicating that the molten aluminum flowed. Total thickness of the stack was reduced to 508 μm.

Different types of baths have been developed for electroless nickel plating e.g., nickel-phosphorus bath, further categorized into acid nickel-phosphorus and alkaline nickel-phosphorus baths, and nickel boron baths etc. An acid nickel-phosphorus bath with a phosphorus content of 7% was employed in this experiment. The melting temperature of electroless nickel deposits vary widely, depending upon the amount of phosphorus alloyed in the deposit. A generally accepted melting point is about 1616° F. (880° C.) for deposits from processes with approximately 7 to 9% phosphorus. This temperature corresponds to the melting point of nickel phosphide ($NiP_3$), which precipitates during heating of electroless nickel deposits. The melting of $NiP_3$ caused the nickel deposition to flow resulting in a loss of shape of the laminae. Another reason for the material flow was absence of the oxide layer on the aluminum laminae, as it was completely removed via Zincate process. This reemphasized the desirability of $Al_2O_3$ to hold liquid aluminum in place at high temperature.

Having illustrated and described the principles of the invention in exemplary embodiments, it should be apparent to those skilled in the art that the illustrative embodiments can be modified in arrangement and detail without departing from such principles. In view of the many possible embodiments to which the principles of the invention can be applied, it should be understood that the illustrative embodiments are intended to teach these principles and are not intended to be a limitation on the scope of the invention. We therefore claim as our invention all that comes within the scope and spirit of the following claims and their equivalents.

We claim:

1. A method of making a monolithic intermetallic structure, comprising:
   providing at least one lamina comprising at least a first metal layer and a second metal layer;
   patterning the at least one lamina to form a patterned lamina;
   stacking and registering the at least one patterned lamina with other laminae selected from the group of patterned laminae, non-patterned laminae and combinations thereof, thereby forming a registered stack;
   coupling together two or more laminae in the stack; and
   processing the stack to make a monolithic intermetallic structure.

2. The method according to claim 1 where patterning is accomplished by a technique selected from the group consisting of machining, pressing, folding, twisting, shrinking, stretching, deforming, and combinations thereof.

3. The method according to claim 2 where machining comprises using a technique selected from the group consisting of lithography, laser ablation, electrochemicalprocesses, chemical etching, plasma etching, mechanical cutting, hydraulic processes, solid abrasion, particle beam, ultrasonic processes, electromagnetic processes, including momentum transfer and energy transfer from any portion of the electromagnetic spectrum, wire and ram electrodischarge (EDM), waterjet and abrasive waterjet, precision plasma cutting, and combinations thereof.

4. The method according to claim 1 where providing comprises procuring a patterned lamina or lamina blank.

5. The method according to claim 1 comprising using at least one lamina blank having multiple layers where each of the layers comprises a substantially pure element.

6. The method according to claim 1 comprising using at least one lamina blank comprising three metal layers.

7. The method according to claim 6 where one of the layers comprises an element different from the other two layers.

8. The method according to claim 6 where one of the layers is substantially pure nickel.

9. The method according to claim 6, where one of the layers is substantially pure titanium.

10. The method according to claim 6 where one of the layers is substantially pure aluminum.

11. The method according to claim 6 wherein two of the layers are substantially pure aluminum, and one layer is substantially pure nickel.

12. The method according to claim 6 where two of the layers are substantially pure aluminum, and one layer is substantially pure titanium.

13. The method according to claim 1 where providing at least one lamina comprises forming a lamina blank by bonding plural layers together using heat and mechanical pressure.

14. The method according to claim 13 where the plural layers are bonded together only along outer edges of the layers.

15. The method according to claim 1 where providing at least one lamina comprises forming a lamina blank by physical vapor deposition of one metal onto another metal.

16. The method according to claim 1 where providing at least one lamina comprises forming a lamina blank by chemical vapor deposition of one metal onto another metal.

17. The method according to claim 13 where forming a lamina blank comprises bonding in a vacuum press.

18. The method according to claim 13 where forming a lamina blank comprises layer surface preparation followed by bonding in a vacuum press under heat and mechanical pressure.

19. The method according to claim 13 where forming a lamina blank comprises layer surface preparation followed by adhesive coupling of the layers.

20. The method according to claim 1 where coupling comprises applying an adhesive between two or more laminae.

21. The method according to claim 1 where coupling comprises bonding at least edges of two or more laminae to one another.

22. The method according to claim 1 where coupling comprises bonding at least a portion of surfaces of two or more laminae to one another.

23. The method according to claim 1 wherein processing comprises vacuum heating at a temperature and for a length of time sufficient to form an intermetallic.

24. The method according to claim 23 wherein processing further comprises liquid-phase bonding.

25. The method according to claim 23 wherein processing further comprises diffusion bonding.

26. The method according to claim 1 wherein the intermetallic structure contains one or more catalysts operatively associated therewith.

27. The method according to claim 1, where the structure is microscopic.

28. The method according to claim 1, where the structure is macroscopic.

29. The method according to claim 1, where the structure is mesoscopic.

30. The method according to claim 1 where at least one lamina comprises a metal selected from the group consisting of aluminum, nickel, titanium, molybdenum, tantalum, copper, gold, silver, lead, tin, iron, antimony, magnesium, manganese, bismuth, germanium, tungsten, alloys thereof and intermetallics thereof.

31. The method according to claim 30 where the metal is a metal foil.

32. The method according to claim 1 where at least one lamina comprises FeAl.

33. The method according to claim 32 where the FeAl is an FeAl foil.

34. The method according to claim 1 where at least one lamina comprises $Fe_3Al$.

35. The method according to claim 34 where $Fe_3Al$ is an $Fe_3Al$ foil.

36. The method according to claim 1 where at least one lamina comprises NiAl.

37. The method according to claim 36 where the NiAl is a NiAl foil.

38. The method according to claim 1 where at least one lamina comprises $Ni_3Al$.

39. The method according to claim 38 where the $Ni_3Al$ is an $Ni_3Al$ foil.

40. The method according to claim 1 where at least lamina comprises TiAl.

41. The method according to claim 40 where the TiAl is a TiAl foil.

42. The method according to claim 1 where at least one lamina comprises $Ti_3Al$.

43. The method according to claim 42 where the $Ti_3Al$ is a $Ti_3Al$ foil.

44. The method according to claim 1 where the stack comprise plural intermetallic foils.

* * * * *